United States Patent Office 2,978,478
Patented Apr. 4, 1961

2,978,478

REACTION OF PHOSPHORUS OXYCHLORIDE AND POLAR POLYHYDRIC COMPOUNDS

Walter J. Sandner, Carpentersville, and William L. Fierce, Crystal Lake, Ill., assignors to The Pure Oil Company, Chicago, Ill., a corporation of Ohio No Drawing. Filed Feb. 5, 1959, Ser. No. 791,289

14 Claims. (Cl. 260—461)

This invention relates to new and useful improvements in processes for the preparation of organophosphorous compounds and to certain novel organophosphorus compounds which are useful as hydraulic fluids, synthetic lubricants, or organic intermediates.

In recent years organophosphorus compounds have been extensively investigated. Organic phosphate esters have been extensively used as synthetic lubricants and hydraulic fluids because of superior properties in certain specialized applications. For example, the phosphate esters are less flammable and less volatile than most hydrocarbon fluids and have better lubricating properties. The thermal and hydrolytic stability of phosphate esters is about the same as that of petroleum hydrocarbons but the viscosity index is only fair in comparison with petroleum hydrocarbons. The simple trialkyl phosphates have been prepared in a variety of ways, as described in Organophosphorus Compounds, Kosolapoff, John Wiley and Sons, Inc., 1950, chapter 9, such as the reaction of phosphorus pentoxide or concentrated phosphoric acid with alcohols, or the reaction of alcohols with phosphorus oxychloride in the presence of a tertiary nitrogen base. The preparation of phosphate esters of polyhydroxy organic compounds, such as glycols and polyglycols, has presented a number of problems which are not solved satisfactorily by any preparatory technique taught by the published prior art. When alkylene glycols or polyglycols are reacted with phosphorus compounds, such as phosphoric acid, phosphorus pentoxide, or phosphorus oxychloride, a number of competing reactions are involved. Firstly, there is the possibility of reaction with both ends of the glycol or polyglycol molecule with the formation of a heterocyclic ester. Secondly, there is the possibility of reaction with opposite ends of the glycol or polyglycol molecule by different phosphorus-containing reagents to form diphosphate or polyphosphate esters. In addition, there are problems presented by the order of addition of reactants and the reaction temperatures used, since a number of different products are obtained by varying these reaction conditions. Solutions to certain of these problems are proposed in our prior copending applications, Serial No. 689,055, filed October 9, 1957, Serial No. 729,231, filed April 18, 1958, and Serial No. 754,727, filed August 13, 1958. Glycerol and other highly polar polyhydroxy organic compounds, however, do not react with phosphorus oxychloride in the same manner as do the alcohols and glycols. Glycerol by itself is completely unreactive toward phosphorus oxychloride. Glycerol is insoluble in ether and other common nonpolar solvents which might be used as a reaction medium therefor. Glycerol is soluble in water but phosphorus oxychloride is hydrolyzed rapidly in water.

It is therefore one object of this invention to provide a new and improved process for the preparation of organophosphorus compounds from polyhydroxy organic compounds.

Another object of this invention is to provide an improved class of phosphorus-containing synthetic lubricants and hydraulic fluids.

A feature of this invention is the provision of an improved process for the preparation of liquid organo-phosphorus compounds by reaction of highly polar polyhydroxy organic compounds, containing at least three hydroxy radicals per molecule, in admixture with ethylene glycol or a lower alkanol or phenol with which the polyhydroxy compond is at least partially mutually soluble, with a phosphorus oxyhalide to produce a phosphate ester or polyester.

Another feature of this invention is the provision of an improved class of organophosphorus compounds produced by reaction of polyhydroxy organic compounds, such as glycerol, erythritol, mannitol, pyrogallol, monosaccharides, or phloroglucinol, in admixture with ethylene glycol or a lower alcohol or phenol with which the polyhydroxy compound is at least partially mutually soluble, with a phosphorus oxyhalide, which organophosphorus compounds are liquid and have satisfactory properties for use as hydraulic fluids or synthetic lubricants.

Other objects and features of this invention will become apparent from time to time throughout the specification and claims as hereinafter related.

This invention is based upon our discovery that novel organophosphorus compounds can be prepared by reacting a mixture of a polar polyhydroxy organic compound (containing three or more hydroxy radicals per molecule), such as glycerol, erythritol, mannitol, monosaccharides, pyrogallol, and phloroglucinol with ethylene glycol or a lower alkanol or phenol, with which the polyhydroxy compound is at least partially mutually soluble, with a phosphorus oxyhalide. In carrying out this reaction, ethylene glycol, or any lower alkanol or phenol which is at least partially soluble in the polyhydroxy organic compound (or vice versa) can be used to effect reaction with the phosphorus oxyhalide. When glycerol is the reactant, the other component of the mixture is preferably a $C_1$-$C_4$ alkanol, benzyl alcohol, phenol, or m-cresol. Any phosphorus oxyhalide can be used in this reaction, including the chloride, bromide, and iodide, although phosphorus oxychloride is a preferred reactant. The reaction conditions are not critical with respect to either temperature or pressure, except that temperatures and pressures are used which will maintain a liquidus system and which avoid too violent a reaction. The reaction will take place at temperatures as low as $-20°$ C. and as high as $50°$ C. and higher. However, temperatures of the order of $0°$–$25°$C. are preferred. The reaction proceeds satisfactorily at atmospheric pressure and will take place under superatmospheric pressure or moderate subatmospheric pressures. The by-product hydrogen halide is preferably stripped from the reaction mixture, although it may be removed by reaction with a tertiary base, such as pyridine or dimethylaniline. The following examples are illustrative of the scope of this invention and the procedures used in carrying out the same.

EXAMPLE I

A 500 ml., 3-necked flask, fitted with a thermometer, dropping funnel, stirrer, and ice-water bath, was charged with 46.1 g. (0.5 mol) glycerol and 74.1 g. (1.0 mol) n-butyl alcohol. The mixture was stirred and cooled to $5°$ C. From the dropping funnel, 76.7 g. (0.5 mol) of phosphorus oxychloride was added, with stirring, to the reaction mixture. The addition time was about one hour and the temperature was maintained in the range from about $10°$–$20°$ C. The reaction mixture in the flask was diluted with 500 ml. of ether, which was added with vigorous stirring. To prevent emulsion formation, a saturated salt water solution was cautiously added in order to remove unreacted phosphorus oxychloride. The flask was continuously cooled with an ice-water bath during this addition of salt water to prevent spewing of the mixture with ether. The ether solution was washed several times with a saturated salt water solution, and finally filtered into a 500 ml., 3-necked stripping flask fitted with a thermometer, nitrogen bubbling tube, and electric heating mantle. The liquid was stripped free of ether and by-product HCl using water-aspirator vacuum, nitrogen bubbling, and heating to 80° C. for a period of two hours. The product which remained was a clear, pale yellow, slightly viscous liquid weighing 31.9 g. This product contained 12.8% w. phosphorus, and had a molecular weight of 450. The product had a pour point of −62° C. and a viscosity index of 143. The phosphorus content of this product corresponds very closely to the theoretical value for a mixed phosphate ester derived from the alcohol and glycerol. However, the molecular weight was approximately 60% higher than the theoretical molecular weight of such a mixed ester, thus indicating that the product was probably a mixture of monophosphate and polyphosphate esters. This product is useful as a synthetic lubricant or hydraulic fluid and may be substituted for petroleum hydrocarbons in such applications, particularly for use at elevated temperatures.

EXAMPLE II

In another experiment, a slightly different product was obtained by varying the proportion of the reactants. In this experiment, the same apparatus and procedure were used as in Example I. In this experiment, one part by wt. of glycerol, three parts by wt. of n-butyl alcohol, and two parts by wt. of phosphorus oxychloride were reacted as described above. The product which was obtained was a liquid ester containing 16.2% w. phosphorus and having a molecular weight of 830. This liquid product had a pour point of −59° C. and a viscosity index of 137. This product had a molecular weight more than twice the calculated molecular weight for a simple ester derived from the reactants used. It is therefore apparent that the product contained a substantial proportion of polyphosphate esters.

EXAMPLE III

In still another experiment, the proportions of the reactants were again varied and a liquid product obtained. In this experiment, one part by wt. of glycerol, six parts by wt. of n-butyl alcohol, and three parts by wt. of phosphorus oxychloride were reacted using the same apparatus and procedure as in the previous examples. A liquid product was obtained which contained 12.8% w. phosphorus and had a molecular weight of 415. This product had a pour point of −62° F. and a viscosity index of 174.

The liquid products of the foregoing examples are useful as synthetic lubricants and as high-temperature hydraulic fluids. These products can be made over a wide viscosity range and yet possess extremely high viscosity indexes. The molecular weight of the product, however, is unpredictable. Regardless of the viscosity of these products, the pour point is always very low, e.g., less than −40° C. The viscosity of the product varies with the proportions of the glycerol (or other polyhydroxy organic compound), alcohol, and phosphrus oxychloride used.

EXAMPLE IV

When the reaction of a mixture of a polyhydroxy organic compound (e.g., glycerol, erythritol, etc.) and a lower alcohol, phenol, or ethylene glycol with a phosphorus oxyhalide is repeated in the manner described above and using the same apparatus, a liquid product is obtained which contains a high proportion of phosphorus and has a viscosity index of the order of 130–150 or higher. In Table I, there is set forth a variety of examples of reactants and the proportions used which will produce liquid phosphate esters having a high proportion of phosphorus and a high viscosity index which make them useful as high-temperature synthetic lubricants or hydraulic fluids.

Table I

| Polyhydroxy Organic Compound (A) | Glycol, Alcohol or Phenol (B) | $P(O)X_2(C)$ | Mol Ratio A:B:C |
|---|---|---|---|
| glycerol | ethanol | $POCl_3$ | 1:2:1 |
| Do | do | $POBr_3$ | 2:1:1 |
| Do | phenol | $POCl_3$ | 2:1:1 |
| Do | m-cresol | $POCl_3$ | 2.5:0.5:1 |
| Do | ethylene glycol | $POCl_3$ | 1.5:1.5:1 |
| erythritol | n-propanol | $POCl_3$ | 2:1:1 |
| Do | methanol | $POCl_3$ | 1:2:1 |
| mannitol | ethylene glycol | $POCl_3$ | 2:1:1 |
| glucose | ethanol | $POCl_3$ | 1:2:1 |
| Do | phenol | $POCl_3$ | 2:1:1 |
| phloroglucinol | methanol | $POCl_3$ | 2.5:0.5:1 |
| Do | ethanol | $POBr_3$ | 2:1:1 |
| Do | phenol | $POCl_3$ | 1:2:1 |

The products which are produced in the above examples are liquids having moderately high viscosities at room temperature. In each case, however, these products have very low pour points, viz., less than about −40° C., and viscosity indexes in excess of about 120. Reaction is substantially complete and substantially no unreacted material is recovered.

While this invention has been described fully and completely with special emphasis upon several preferred embodiments thereof, as required by the patent statutes, we wish it understood that within the scope of the appended claims this invention may be practiced otherwise than as specifically described herein.

What is claimed is:

1. A method of preparing organophosphorus compounds which comprises reacting a phosphorus oxyhalide with at least one polyhydroxy polar organic compound having at least three hydroxy radicals per molecule, and which is insoluble in non-polar solvents, in admixture with at least one compound selected from the group consisting of ethylene glycol, lower alkanols, and phenols, with which said polyhydroxy compound is at least partially mutually soluble.

2. A method in accordance with claim 1 in which the phosphorus oxyhalide is phorus oxychloride.

3. A method in accordance with claim 1 in which the polyhydroxy organic compound is selected from the group consisting of glycerol, erythritol, mannitol, trihydroxy benzenes, and polar monosaccharides.

4. A method of preparing organophosphorus compounds which comprises reacting phosphorus oxychloride with a mixture of glycerol and a $C_1$–$C_4$ alkanol, and recovering a liquid product.

5. A method of preparing organophosphorus compounds which comprises reacting phosphorus oxychloride with a mixture of glycerol and phenol, and recovering a liquid product.

6. A method of preparing organophosphorus compounds which comprises reacting phosphorus oxychloride with a mixture of glycerol and a cresol, and recovering a liquid product.

7. A method of preparing organophosphorus compounds which comprises reacting phosphorus oxychloride with a mixture of glycerol and benzyl alcohol, and recovering a liquid product.

8. Mixed phosphate esters produced by reaction of a phosphorus oxyhalide with a mixture of at least one polyhydroxy polar organic compound containing at least three hydroxy radicals per molecule, which is insoluble in non-polar solvents, and at least one compound selected from the group consisting of ethylene glycol, lower alkanols, and phenols with which said polyhydroxy compound is at least partially mutually soluble.

9. Mixed phosphate esters in accordance with claim 8 in which the polyhydroxy compound is selected from the group consisting of glycerol, erythritol, mannitol, trihydroxy benzenes, and polar monosaccharides.

10. Mixed phosphate esters produced by reaction of phosphorus oxychloride with a mixture of glycerol and a $C_1$–$C_4$ alkanol.

11. Mixed phosphate esters produced by reaction of phosphorus oxychloride with a mixture of glycerol and phenol.

12. Mixed phosphate esters produced by reaction of phosphorus oxychloride with a mixture of glycerol and a cresol.

13. Mixed phosphate esters produced by reaction of phosphorus oxychloride with a mixture of glycerol and benzyl alcohol.

14. A method in accordance with claim 1 in which the phosphorus oxyhalide is added to the mixture containing the polar polyhydroxy organic compound, at a temperature of −20° to +50° C.

References Cited in the file of this patent

UNITED STATES PATENTS

| | | |
|---|---|---|
| 2,643,261 | Matuszak et al. | June 23, 1953 |
| 2,892,862 | Lanham | June 30, 1959 |

UNITED STATES PATENT OFFICE
CERTIFICATION OF CORRECTION

Patent No. 2,978,478            April 4, 1961

Walter J. Sandner et al.

It is hereby certified that error appears in the above numbered patent requiring correction and that the said Letters Patent should read as corrected below.

Column 4, line 42, for "phorus" read -- phosphorus --.

Signed and sealed this 22nd day of August 1961.

(SEAL)
Attest:

ERNEST W. SWIDER            DAVID L. LADD
Attesting Officer             Commissioner of Patents